United States Patent [19]
Ueda

[11] Patent Number: 5,631,749
[45] Date of Patent: May 20, 1997

[54] COLOR IMAGE SIGNAL PROCESSING DEVICE

[75] Inventor: Masashi Ueda, Nagoya, Japan

[73] Assignee: Brother Kogyo Kabushiki Kaisha, Nagoya, Japan

[21] Appl. No.: 573,488

[22] Filed: Dec. 15, 1995

[30] Foreign Application Priority Data

Jan. 12, 1995 [JP] Japan ................ 7-021043

[51] Int. Cl.$^6$ ...................... G03F 3/08
[52] U.S. Cl. ............ 358/520; 358/518; 358/523; 358/501
[58] Field of Search ............... 358/518, 520, 358/521, 515, 524, 525, 523, 530, 500, 501; 382/274; G03F 3/08

[56] References Cited

U.S. PATENT DOCUMENTS

| | | | |
|---|---|---|---|
| 4,819,077 | 4/1989 | Kikuchi et al. | 358/520 |
| 4,843,573 | 6/1989 | Taylor et al. | 364/521 |
| 4,958,217 | 9/1990 | Kimura et al. | 358/520 |
| 4,959,711 | 9/1990 | Hung et al. | 358/518 |
| 4,965,664 | 10/1990 | Udagawa et al. | 358/518 |
| 5,065,234 | 11/1991 | Hung et al. | 358/518 |
| 5,231,504 | 7/1993 | Magee | 358/520 |
| 5,299,291 | 3/1994 | Ruetz | 395/109 |
| 5,434,683 | 7/1995 | Sekine et al. | 358/520 |
| 5,438,649 | 8/1995 | Ruetz | 395/109 |
| 5,452,017 | 9/1995 | Hickman | 348/646 |
| 5,481,380 | 1/1996 | Bestmann | 358/504 |
| 5,489,996 | 2/1996 | Oku et al. | 358/518 |
| 5,500,921 | 3/1996 | Ruetz | 395/109 |

FOREIGN PATENT DOCUMENTS 63-162248   7/1988   Japan .

*Primary Examiner*—Edward L. Coles, Sr.
*Assistant Examiner*—Madeleine A.V. Nguyen
*Attorney, Agent, or Firm*—Oliff & Berridge

[57] ABSTRACT

Any color on a CRT display is selected, and a selection operation is carried out to adjust the selected color to a color which is suitable to be reproduced by a printer. On the selected information, a hue conversion table adjustment unit corrects a conversion characteristic data of a hue conversion table. A hue component of a color signal on the CRT display is converted using the corrected conversion characteristic data.

20 Claims, 5 Drawing Sheets

Fig.4

| ADDRESS | 0 | 2n | 2(n+1) | last-2 |
|---|---|---|---|---|
| INPUT HUE VALUE | 0 | Hin1 | Hin2 | 360 |
| OUTPUT HUE VALUE | 0 | Hout1 | Hout2 | 360 |

Fig.5

| ADDRESS | 0 | 2n | 2(n+1) | 2(n+2) | last-2 |
|---|---|---|---|---|---|
| INPUT HUE VALUE | 0 | Hin1 | Hin | Hin2 | 360 |
| OUTPUT HUE VALUE | 0 | Hout1 | Houtnew | Hout2 | 360 |

Hin1 < Hin < Hin2

COLOR IMAGE SIGNAL PROCESSING DEVICE

BACKGROUND OF THE INVENTION

1. Field of the Invention

The invention relates to a color image signal processing device for converting a color signal of an image for a first device, such as a color CRT, to a color signal with which the image is reproduced by a second device, such as a color printer.

2. Description of Related Art

In a conventional color image signal processing device for converting RGB (red, green and black) signals for a first device, such as a color CRT, to CMYK (cyan, magenta, yellow, black) signals which are control signals for a second device, such as a color printer, a conversion process is generally carried out as follows when the color signal is described with 8 bits in each device. That is, assuming that the three signals of CMY are complementary color signals of RGB, the conversion processing is carried out according to the following equation:

$$C=255-R, \ M=255-G, \ Y=255-B$$

Various calculation methods have been proposed to calculate the black color signal of K and, generally the minimum value of each signal of CMY is used.

However, in such a color image signal processing device using numerical values which are dependent on the respective devices, it is difficult to match a reproduced color image with user's color sense, and it is also difficult to perform color correction and color conversion so as to achieve visual color matching.

Further, a color-correction and color-conversion target mainly concentrates on the adjustment of hue. For the color signals of the RGB and CMYK, the color to be reproduced is dependent on a device, so that conversion to accurate hue data cannot be performed and accurate transmission cannot be performed.

In order to solve this problem, some proposals have been made in U.S. Pat. Nos. 4,965,664 and No. 4,843,573. In these proposals, from the viewpoint that most of color-correction targets are concentrated on the correction of hue, the color correction is performed on the basis of three signals of H (hue), V (brightness) and C (chroma) (not using the RGB signals). Further, the problem that the color reproduction is dependent on device characteristics can be solved by using signals which are based on the CIE (Commission Internationale de l'Eclairage or International Commission on Illumination) system as an international standard which is not dependent on a device. In the CIE system, an XYZ color system (hereinafter, the value of XYZ is referred to as "CIE1931XYZ value") was instituted as a method of representing a color with a numerical value in 1931. A L*a*b* color system (hereinafter, the value of L*a*b* is referred to as "CIE1976L*a*b* value") was instituted in 1976.

However, according to these conventional methods, the color matching is performed only on the basis of the color values of the CIE system and, thus, it is not applicable to overcome a visual color difference due to the difference in the color mixing mechanism between the color reproduction of an additive color mixing system based on coloring like CRT and the color reproduction of a subtractive color mixing system based on ink color materials like a printer. Furthermore, in some cases it is better to reproduce a color different from an actual color, for colors such as skin color, sky color, or lawn color (so-called memory color), to achieve excellent color reproduction. However, the conventional color conversion method aims to achieve numerically coincident color at all times. Thus, in some cases it does meet the user's intention.

SUMMARY OF THE INVENTION

An object of the invention is to provide a color image signal processing device in which, when a color signal of an image for a first device is reproduced by a second device, a user can easily alter to a desired hue conversion characteristic to perform proper color reproduction from the viewpoint that a color matching of hue in three attributes of color takes an important role for color reproduction.

In order to attain the above object, according to the invention, a color image signal processing device comprises hue calculation means for calculating a hue value from the color signal of an image for a first device, hue conversion means for performing a conversion operation to reproduce the hue value, calculated in the hue calculation means, by a second device, first color selection means for selecting a color of an image for the first device, second color selection means for selecting a color to be reproduced by the second device, and conversion characteristic correcting means for correcting a conversion characteristic of the hue conversion means on the basis of the color selected by the first color selection means and the color selected by the second color selection means.

In the color image signal processing device according to the invention, the hue conversion means may be provided with hue conversion value storage means for presetting and storing hue values of the first device into which a hue range of the first device is arbitrarily divided by the hue conversion means, and hue values of the second device which correspond to the hue values of the first device, and the conversion characteristic correcting means may be also provided with address calculation means for calculating an address in the hue conversion value storage means on the basis of the color selected by the first color selection means, hue conversion characteristic calculation means for calculating a new conversion characteristic on the basis of the colors which are selected by the first color selection means and the second color selection means, and hue conversion value correcting means for correcting a storage content of the hue conversion value storage means on the basis of the address calculated by the address calculation means and the new conversion characteristic calculated by the hue conversion characteristic calculation means.

The color image signal processing device of the invention may be designed so that the storage capacity of the hue conversion value storage means is variable.

In the color image signal processing device thus structured, the hue calculation means calculates the hue value on the basis of the color signal of the image for the first device, and the hue conversion means converts the calculated hue value for reproduction by the second device. A user selects the color of the image for the first device through the first color selection means, and selects the desired color to be reproduced by the second device through the second color selection means. On the basis of both of the selected colors, the conversion characteristic correcting means corrects the conversion characteristic of the hue conversion means. When the conversion characteristic is corrected once, the desired color which is selected by the second color selection means for the color selected by the first color selection means is subsequently reproduced by the second device.

Furthermore, in the color image signal processing device of the invention, the hue calculating means of the hue conversion means interpolatively calculates the hue value on the basis of information stored in the hue conversion value storage means. The conversion characteristic correcting means calculates the address in the hue conversion value storage means on the basis of the color selected by the first color selection means, and calculates a new conversion characteristic on the basis of the colors selected by the first color selection means and the second color selection means to correct the storage content of the hue conversion value storage means on the basis of the calculated address and the new conversion characteristic. With this operation, the hue value is interpolatively calculated in the hue conversion value storage means if the occasion demands, and the storage content is corrected to a new value in accordance with the user's selection.

Still further, in the color image signal processing device of the invention, the storage capacity of the hue conversion value storage means is variable, and a user's desired conversion characteristic can be developed.

As is apparent from the foregoing, according to the color image signal processing device of the invention, the hue conversion characteristic can be corrected on the basis of the selection of the color to be input from the first device and the color to be reproduced by the second device, so that a color which is needed by the user or matched with user's sense can be easily reproduced by the second device.

According to the color image signal processing device of the invention, the hue value is interpolatively calculated to correct the hue conversion value of the hue conversion value storage means, so that the reproduced color can be prevented from sharply varying when the hue varies slightly.

According to the color image signal processing device of the invention, the storage capacity of the hue conversion value storage means is variable, so that the hue conversion value can be freely altered to a user's favorite one.

BRIEF DESCRIPTION OF THE DRAWINGS

A preferred embodiment of the invention will be described in detail with reference to the following figures wherein:

FIG. 4 shows a hue conversion table before correction;

FIG. 5 shows a hue conversion table after correction; and

DETAILED DESCRIPTION OF PREFERRED EMBODIMENT

A preferred embodiment of the invention will be described in detail with reference to the accompanying drawings.

Figure 1:
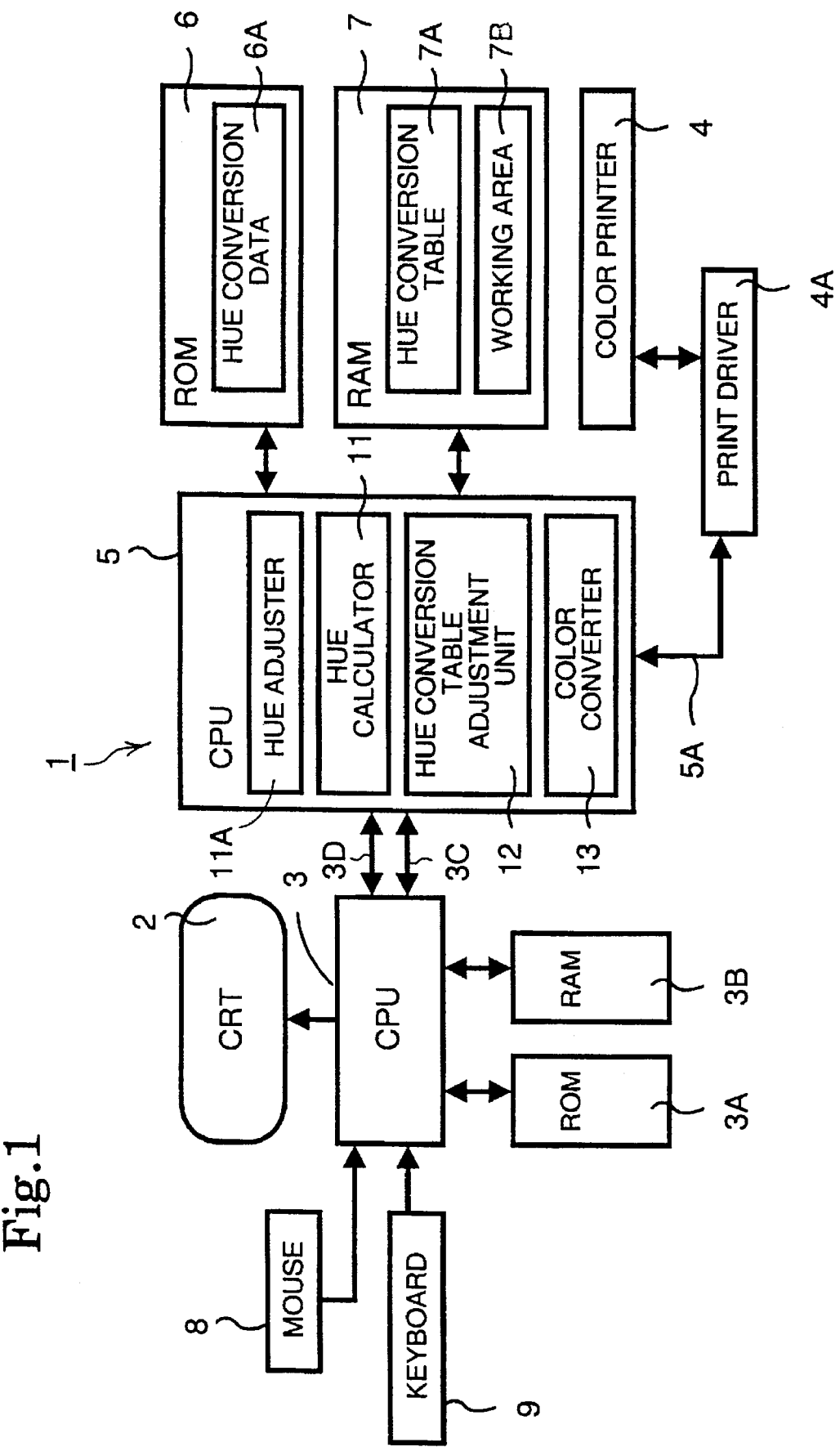
FIG. 1 is a block diagram showing a color image signal processing device of an embodiment according to the invention.

FIG. 1 shows the overall structure of a color image signal processing device of an embodiment according to the invention (hereinafter referred to as "the device"). The device converts a color signal of an image for a color CRT display 2 (first device) to reproduce the image signal in a color printer 4 (second device). The device 1 includes a CPU 3 for outputting the color signal of the image to the CRT display 2, a ROM 3A in which a control program for the CPU 3, is stored, a RAM 3B for storing signals to be input to and output from the CPU 3, a CPU 5 for conducting conversion processing on the color signal and outputting the processed color signal to a color printer 4 through a print driver 4A, a ROM 6 in which hue conversion data 6A and conversion programs are stored, and a RAM 7 provided with a hue conversion table 7A and a working area 7B. The CPU 3 is connected to a mouse 8 and a keyboard 9 to input operation commands. The CPU 3 and the CPU 5 are connected to each other through a bus 3C so that they are allowed to communicate therebetween. The CPU 5 is connected to the ROM 6 and the RAM 7. The CPU 5 has various functions, such as a hue calculator 11, a hue conversion table adjustment unit 12 and a color converter 13.

The operation of the device 1 is described as follows. First, a normal operation will be described.

When a print command to perform a print operation of color image data, displayed on a CRT display 2, by a color printer 4 is transmitted from the CPU 3 to the CPU 5, the CPU 5 searches for an address of the hue conversion table 7A in the RAM 7. If no data exist in the hue conversion table 7A, the CPU 5 accesses the hue conversion data 6A in the ROM 6 and writes the data at a predetermined area of the RAM 7. Thereafter, the image data are transmitted from the CPU 3 to the hue calculator 11 of the CPU 5 to calculate a hue value from the color signal in the image data. The hue value is further converted in the color converter 13 so that it is reproduced by the printer. The conversion by the color converter 13 is carried out while referring to the hue conversion table 7A stored in the RAM 7. The CPU 5 controls the color printer 4 through the print driver 4A on the basis of the data after the conversion to print the image.

Next, an adjusting operation of matching the hue conversion table 7A, stored in the RAM 7, to an user's favorite one will be described. When the print command is transmitted from the CPU 3 through the bus 3C to the CPU 5 and the CPU 5 confirms that data exist in the hue conversion table 7A, the CPU 5 outputs a signal to the CPU 3 to inquire of the CPU 3 whether the hue conversion table 7A should be adjusted. This inquiry signal is displayed on the CRT display 2 by the CPU 3. This inquiry is carried out at all times in normal operation. In response to the inquiry, the user manipulates the mouse 8 or the keyboard 9 to input his/her response as to whether the hue conversion table 7A is to be adjusted. The response signal is returned from the CPU 3 through the bus 3C to the CPU 5.

When the CPU 5 is supplied with the signal instructing the adjustment of the hue conversion table 7A, the CPU 5 transmits through the bus 3C to the CPU 3 a signal requesting selection of a color to be subjected to the hue adjustment on the CRT 2. The CPU 3 displays the request for the selection of the color to be subjected to the hue adjustment on the CRT 2. The user manipulates the mouse 8 or the keyboard 9 to select the color on which the user wants to conduct the hue adjustment on the CRT 2, and inputs the selected color to the CPU 3. When the color selection is completed, the CPU 3 transmits the hue data (color signal) of the selected color on the CRT display 2 through the bus 3C to the CPU 5. The hue conversion table adjustment unit 12 of the CPU 5 receives the transmitted data. The above structure and processing correspond to the first color selection means.

Subsequently, the CPU 5 transmits from the bus 3C to the CPU 3 a signal which instructs the CPU 3 to transmit a hue adjustment amount (ΔH). The hue adjustment amount is used for the selected color so that a desired color can be reproduced by the color printer 4. The user manipulates the mouse 8 or the keyboard 9 to input the hue adjustment amount (ΔH) to the CPU 3. The input hue adjustment amount (ΔH) is the transmitted from the CPU 3 through the bus 3D to the CPU 5. The hue adjuster 11A of the CPU 5 receives the transmitted data (ΔH). The above structure and processing correspond to the second color selection means. The hue adjuster 11A adjusts the selected color on the basis of the hue adjustment amount ΔH. The hue conversion table adjustment unit 12 corrects the hue conversion table 7A on the basis of the adjusted data by the hue adjuster 11A to alter the data of the hue conversion table 7A in the RAM 7.

Subsequently, the operation as described above will be described in more detail. In the following description, a CIE1931XYZ value output from the CPU 3 is subjected to the hue conversion to be altered to a new CIE1931XYZ value. Further, the new CIE1931XYZ value is converted to CMYK signals by a well-known CMY conversion method and then input to the print head driver 4A, that is, the conversion is carried out on a so-called device independent color system.

Before describing the invention in more detail, a conversion equation to convert the CIE1931XYZ value to an HVC (hue, brightness, chroma) value will be described.

The three stimulus values (signal values) in the CIE1931XYZ color system of a white color on the CRT display are represented by Xn, Yn and Zn respectively, and the three stimulus values (signal values) in the CIE1931XYZ color system of any color of an image for the CRT 2 which is output from the CPU 3 are represented by X, Y and Z respectively. An L*a*b* based on the CIE1976L*a*b* color system is calculated on the basis of the above data according to the following equation (1):

$$L^* = 116\, (Y/Yn)^{1/3} - 16$$

$$a^* = 500\, \{(X/Xn)^{1/3} - (Y/Yn)^{1/3}\}$$

$$b^* = 200\, \{(Y/Yn)^{1/3} - (Z/Zn)^{1/3}\}$$

Here, when any one of (X/Xn), (Y/Yn) and (Z/Zn) is below 0.008856, the term of the corresponding cubic root is varied to 7.787(X/Xn)+16/116, 7.787(Y/Yn)+16/116, 7.787(Z/Zn)+16/116. The following equation (2) is used to convert the above value to HVC:

$$H0 = ARCTAN\, (b^*/a^*) \times 180/\pi$$

For $a^* > 0$ and $b^* \geq 0$, $H = H0$

For $a^* < 0$ and $b^* \geq 0$, $H = 180 - H0$

For $a^* > 0$ and $b^* \leq 0$, $H = H0 + 180$

For $a^* < 0$ and $b^* \leq 0$, $H = 360 - H0$

For $a^* = 0$ and $b^* > 0$, $H = 90$

For $a^* = 0$ and $b^* < 0$, $H = 270$

For $a^* = 0$ and $b^* = 0$, there is no color. "No color" means a color having only brightness and having no concept of "hue" like white, black and gray, however, it is assumed to be a value having H=0 for the sake of convenience.

$$V = L^*$$

$$C = (a^{*2} - b^{*2})^{1/2}$$

Next, a system for connecting the CRT display 2 and the color printer 4 in this embodiment will be described in detail.

In this embodiment, data transmission between the devices is carried out using a so-called device independent color, such as the CIE1931XYZ color system (hereinafter, a value of this color system is referred to as "XYZ"), which is one of the color systems that are not dependent on the devices.

Figure 2:
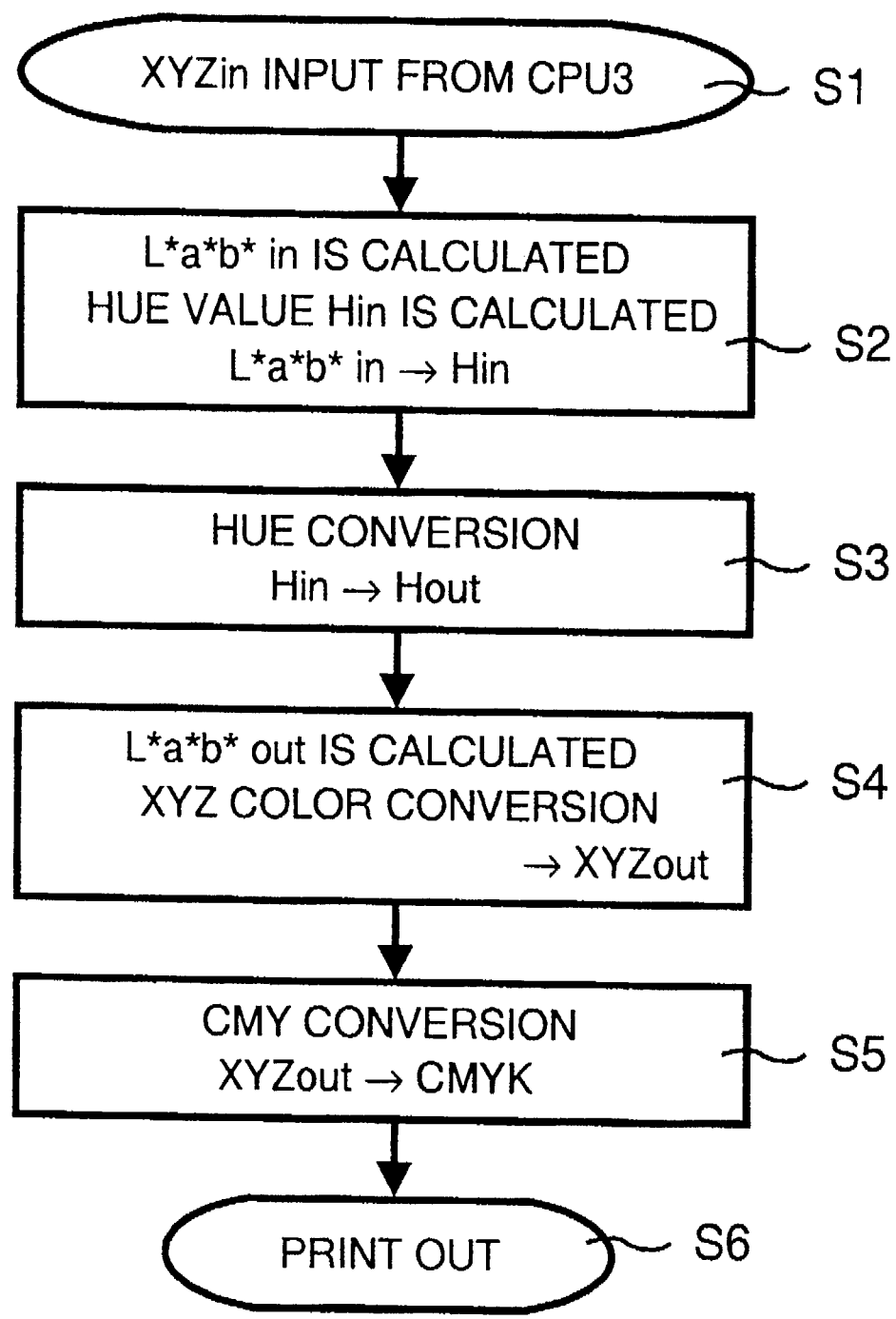
FIG. 2 is a flowchart for a color conversion processing of the device of the embodiment.

First, flow of the color conversion will be described with reference to FIGS. 1 and 2.

When an input value XYZin is input from the CPU 3 through the bus 3C to the CPU 5 (S1), the input value XYZin is converted to an L*a*b* value according to the conversion equation (1) in the hue calculator 11 of the CPU 5. Subsequently, the L*a*b* value is converted to an input hue value Hin according to the equation (2) in the hue calculator 11 (S2). Subsequently, the color converter 13 refers to the hue conversion table 7A of the RAM 7 to judge whether the value corresponding to the hue value Hin is stored as the input hue value. If the judgment is "Yes", the output color hue value Hout corresponding to the input hue value Hin is accessed. If the judgment is "NO", the output hue value Hout is estimated by an interpolating method as described later (S3). Subsequently, L*a*b*out values are calculated on the basis of the calculated hue value and the L*a*b* value according to the following equation (3):

$$L^*out = L^*in$$

$$a^*out = \cos(Hout \times \pi/180) \times (a^*in^2 + b^*in^2)^{1/2}$$

$$b^*out = \sin(Hout \times \pi/180) \times (a^*in^2 + b^*in^2)^{1/2}$$

Next, on the basis of the L*a*b*out values, the XYZout values are calculated according to the following equation (4) (S4):

$$Y0 = (L^*out + 16)/116$$

$$X0 = a^*out/500 + Y0$$

$$Z0 = Y0 - b^*out/200$$

$$Xout = X0^3 \times Xn$$

$$Yout = Y0^3 \times Yn$$

$$Zout = Z0^3 \times Zn$$

When any one of X0, Y0 and Z0 is below $(0.008856)^{1/3}$, the corresponding XYZout values are calculated according to the following equations:

$$Xout = (X0 - 16/116)/7.787$$

$$Yout = (Y0 - 16/116)/7.787$$

$$Zout = (Z0 - 16/116)/7.787.$$

Subsequently, the XYZout values are converted to CMY values by using the well-known CMY conversion in the color converter 13 (S5). The CMY value signals are transmitted from the CPU 5 through the bus 5A and the print head driver 4A to the printer print head 4 to reproduce the image through the print operation (S6).

Figure 3:
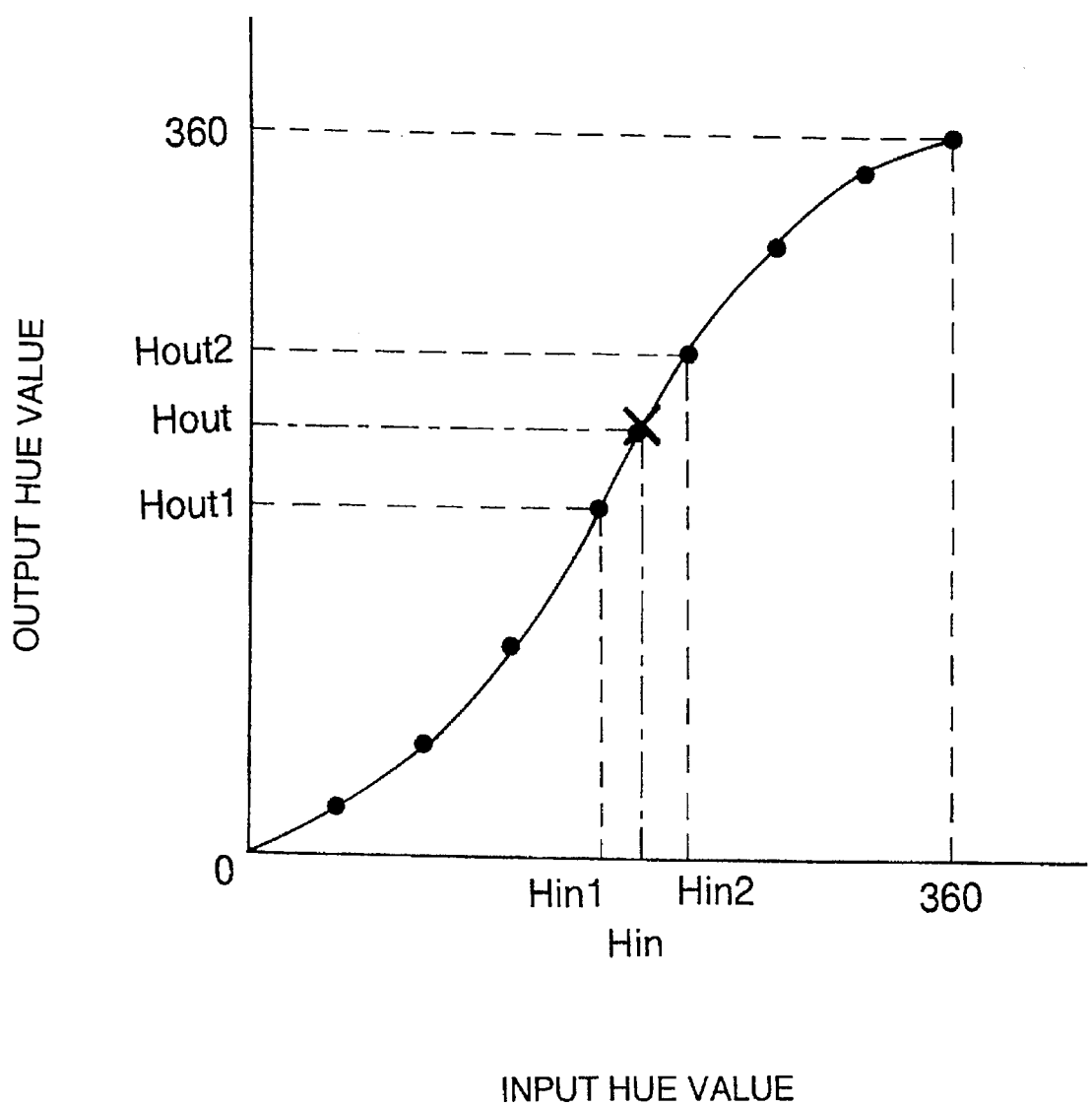
FIG. 3 is a graph showing an interpolating method in hue conversion.

Next, the interpolating method will be described with reference to FIGS. 3, 4 and 5. FIG. 3 is a graph whose abscissa axis shows the input hue value described in the hue conversion table 7A and whose ordinate axis shows the output hue value. FIG. 4 shows values stored in the hue conversion table 7A. The graph of FIG. 3 and the table of hue values described in the hue conversion table in FIG. 4 are illustrated as ranging from 0 to 360 in both input hue value and output hue value. However, there would be no problem even when the hue range exceeds the above range in a positive or negative direction insofar as it covers the hue range from 0 to 360. In this case, the hue value range is illustrated as ranging from 0 to 360 because any hue value is represented by a hue ring.

If the input hue value Hin is a hue value given to the color converter 13, the output hue value Hout is obtained as follows. Input hue values Hin1 and Hin2 which are located before and after the input hue value Hin are searched by the hue conversion table 7A, and the output hue values Hout1 and Hout2 corresponding to the input hue values Hin1 and Hin2 are further obtained. Thereafter, Hout is calculated according to the following equation (5):

$$Hout=(Hin-Hin1)/(Hin2-Hin1)\times(Hout2-Hout1)+Hout1$$

FIG. 5 shows the interpolated hue conversion table 7A. The above description is for the processing method of converting the XYZin values for the CRT 2 output from the CPU 3 into the XYZoutput values for the color printer 4.

Figure 6:
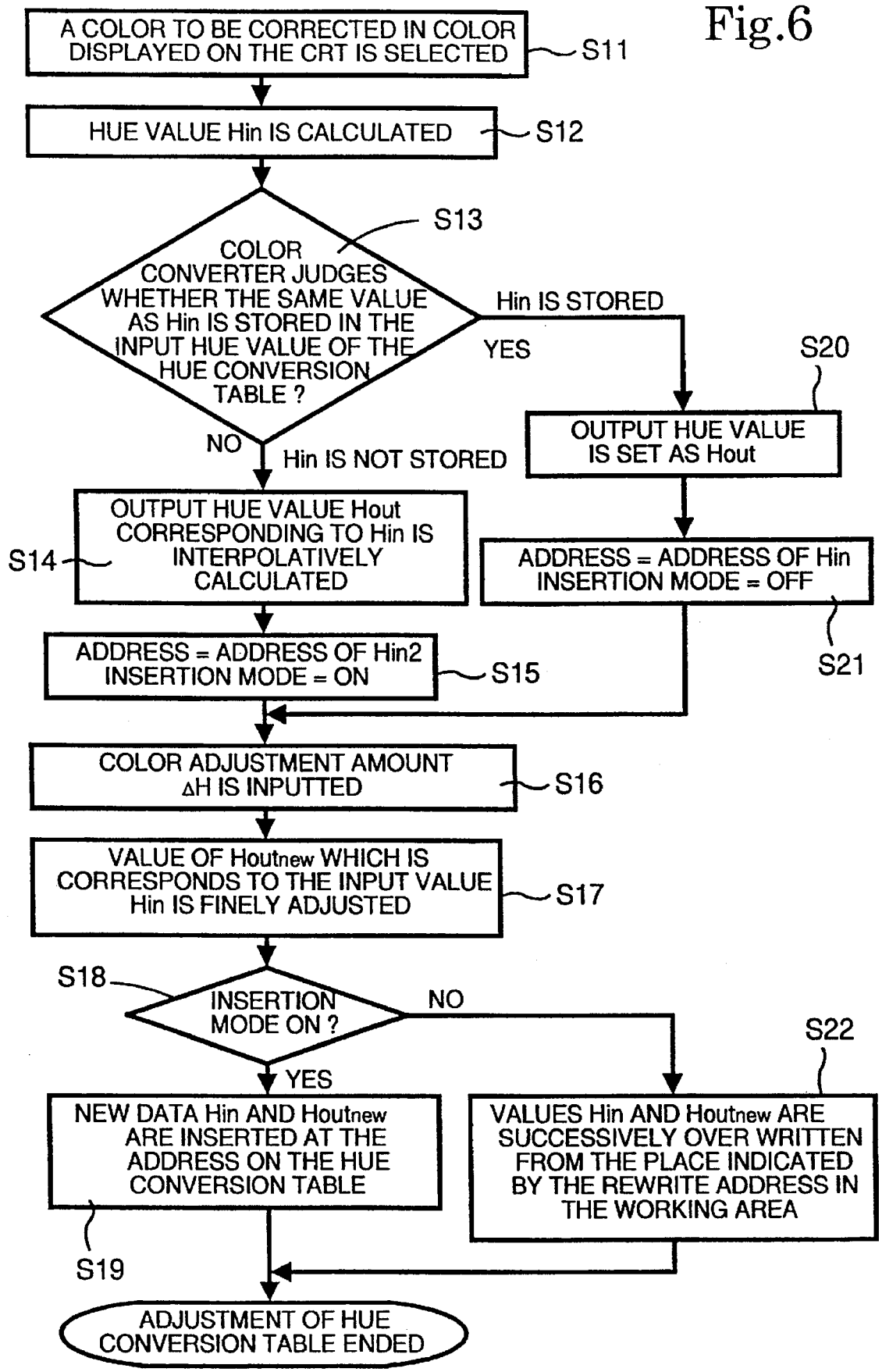
FIG. 6 is a flowchart for a correction processing flow of a hue conversion table.

Next, the correction method of the hue conversion table 7A which is the feature of the invention will be described with reference to FIG. 6.

A color to be corrected of the colors displayed on the CRT 2 is selected by using the mouse 8 or the keyboard 9 (S11). The selected XYZ values are transmitted from the CPU 3, through the bus 3C, to the CPU 5. The hue calculator 11 of the CPU 5 reads in the XYZ values of the selected color and calculates the hue value Hin on the basis of the equations (1) and (2) (S12). The color converter 13 judges whether the same value as Hin is stored in the input hue values of the hue conversion table 7A (S13). If it is not stored in the hue conversion table 7A, the output hue value Hout corresponding to Hin is interpolatively calculated according to the equation (5) as described above (S14). Further, the address 2(n+1) of Hin2 on the hue conversion table 7A of the RAM 7 is stored as a rewrite address in the working area 7B of the RAM 7, and an insertion mode is stored in the working area 7B of the RAM 7 (S15).

Subsequently, when, using the CRT display 2 and the mouse 8 or the keyboard 9, the user inputs a color adjustment amount ($\Delta H$) of the output hue Hout by which the selected color is varied from the color which has been obtained through the color conversion until now (S16), the color adjustment amount ($\Delta H$) of the output hue Hout is transmitted from the CPU 3, through the bus 3D, to the hue adjuster 11A, of the CPU 5, the value of Hout which corresponds to the input value Hin is finely adjusted (S17). Various methods may be used as an input method of the color adjustment amount of the output hue Hout. For example, it may be adopted that various colors for selection of a fine adjustment amount are displayed on the CRT display 2 and then a desired color is selected by the mouse 8 or key board 9. Alternatively, a numerical value may be input from the keyboard connected to the CPU 3. Hue adjuster 11A calculates a new Hout ($Hout_{new}$) according to $Hout_{new}=Hout+\Delta H$.

Subsequently, the hue conversion adjustment unit 12 checks the on/off status of the insertion mode which is stored in the working area 7B of the RAM 7 (S18). If the insertion mode is on, the hue conversion adjustment unit 12 inserts new data Hin and $Hout_{new}$ at the address in the hue conversion table 7A which corresponds to 2(n+1) stored as the rewrite address in the working area 7B of the RAM 7 (S19), and data subsequent to Hin2 are shifted backwardly every two addresses (see FIG. 5). If Hin is equal to any one of the input hue values stored in the hue conversion table 7A (S13), the corresponding output hue value is set as Hout (S20). Further, the address in the hue conversion table 7A of the input hue value in which the same value as Hin is stored is stored as the rewrite address in the working area 7B of the RAM 7, and the off status of the insertion mode is stored in the working area 7B of the RAM 7 (S21).

The fine adjustment of Hout is performed in the same processing as described above. Thereafter, since the insertion mode stored in the working area 7B is off (S18:No), the values Hin and $Hout_{new}$ are successively overwritten from the place indicated by the rewrite address stored in the working area 7B (S22).

As described above, by using the hue conversion table 7A whose conversion characteristic is corrected, a user's target color can be subjected to the color conversion in accordance with the user's taste. Further, color in the vicinity of Hin can be finely adjusted to keep continuity by the new hue conversion table 7A to which is added the input hue Hin and the output hue $Hout_{new}$, so that jumping (discontinuity) of reproduced color due to the correction of the hue conversion table 7A can be prevented.

In this embodiment, the color conversion in the device independent color, such as the CIE1931XYZ color system, is described in detail. However, the invention is also applicable to a device for inputting and outputting RGB or CMYK which is the device color, by inserting color conversion means as disclosed in Japanese Laid-open Patent application No. Sho-63-162248 between the device color and the color image signal processing device of the invention.

What is claimed is:

1. A color image signal processing device, comprising:

hue calculation means for calculating a hue value from the color signal of an image for a first device;

hue conversion means for converting the hue value calculated in said hue calculation means to reproduce the image by a second device;

first color selection means for selecting a color of an image for said first device;

second color selection means for selecting a color to be reproduced by said second device; and conversion characteristic correcting means for correcting a conversion characteristic of said hue conversion means on the basis of the color selected by said first color selection means and the color selected by said second color selection means.

2. The color image signal processing device as claimed in claim 1, wherein said hue conversion means includes hue conversion value storage means for presetting and storing hue values of said first device into which a hue range of said first device is arbitrarily divided and hue values of said second device which correspond to the hue values of said first device, said conversion characteristic correcting means including address calculation means for calculating an address in said hue conversion value storage means on the basis of the color selected by said first color selection means, hue conversion characteristic calculation means for calculating a new conversion characteristic on the basis of the colors which are selected by said first color selection means and said second color selection means, and hue conversion value correcting means for correcting a storage content of said hue conversion value storage means on the basis of the address calculated by said address calculation means and the new conversion characteristic calculated by said hue characteristic calculation means.

3. The color image signal processing device as claimed in claim 1, wherein the second color selection means is a color adjustment amount inputting means.

4. The color image signal processing device as claimed in claim 3, wherein the color adjustment amount inputting means inputs a hue adjustment amount ΔH.

5. A color image signal processing device, comprising:
a first output device for a color image;
a second output device for a color image;
a first controller for controlling the first output device;
a second controller for controlling the second output device;
input means connected to the first controller;
a read only memory electronically connected to the second controller storing hue conversion data; and
a random access memory electronically connected to the second controller containing a working area and space for a hue conversion table, wherein the second controller includes means for calculating hue, a hue conversion table adjustment unit and a color converter, the first and second controllers electrically connected to permit selection of a hue for correction and the amount of correction to be applied.

6. The color image signal processing device as claimed in claim 5, wherein the first output device is a CRT display and the second output device is a color printer.

7. The color image signal processing device as claimed in claim 6, wherein the means for calculating hue calculates a hue for the second output device based on the amount of correction to be applied to the selected hue from the first output device.

8. The color image signal processing device as claimed in claim 7, wherein the means for calculating hue is a hue adjuster which is a part of the second controller.

9. The color image signal processing device as claimed in claim 6, wherein the hue conversion table adjustment unit changes the hue conversion table to reflect an output hue for the second output device based upon the selected hue of the first output device.

10. A method for converting a hue shown on a first output device to a hue output to a second output device, comprising the steps of:
selecting a color from the first output device, as an $XYZ_{in}$ value;
calculating a $L^*a^*b^*_{in}$ value from the $XYZ_{in}$ value;
converting the $L^*a^*b^*_{in}$ value to an input hue value $H_{in}$;
determining whether a value $H_{OUT}$ exists in a hue conversion means that corresponds to $H_{in}$;
establishing a value $H_{OUT}$;
calculating an $L^*a^*b^*_{out}$ value based on $H_{OUT}$;
converting the $L^*a^*b^*_{out}$ value to a $XYZ_{out}$ value;
converting the $XYZ_{out}$ value to a CMY signal; and
outputting the CMY signal to the second output device.

11. The method as claimed in claim 10, wherein the step of establishing a value $H_{OUT}$ further comprises the step of checking a lookup table to determine whether a value $H_{OUT}$ exists for the value $H_{in}$.

12. The method as claimed in claim 11, wherein when a value $H_{OUT}$ does not exist in the table for the value $H_{in}$, the step of establishing a value $H_{OUT}$ further comprises the steps of using table values to interpolatively calculate the value $H_{OUT}$.

13. The method as claimed in claim 12, wherein interpolatively calculating the value $H_{OUT}$ determines the relationship of $H_{in}$ to table values on either side of $H_{in}$ and calculates the value $H_{OUT}$ to have a similar relationship to table values $H_{OUT}$ corresponding to the table values on either side of $H_{in}$.

14. The method as claimed in claim 13, further comprising the step of adjusting the table to incorporate the value $H_{in}$ and the interpolated value $H_{OUT}$ corresponding thereto.

15. The method as claimed in claim 10, wherein calculating the $L^*a^*b^*_{in}$ value is calculated according to:

$$L^*=116(Y/Y_n)^{1/3}-16$$

$$a^*=500\{(X/X_n)^{1/3}-(Y/Y_n)^{1/3}\}$$

$$b^*=200\{(Y/Y_n)^{1/3}-(Z/Z_n)^{1/3}\}$$

where a white color on the first output device is represented by $X_n$, $Y_n$ and $Z_n$.

16. The method as claimed in claim 15, wherein when any one of $X/X_n$, $Y/Y_n$, and $Z/Z_n$ is less than 0.00856, the corresponding cubic root is substituted by $7.787(X/X_n)+16/116$, $7.787(Y/Y_n)+16/116$, and $7.787(Z/Z_n)+16/116$.

17. The method as claimed in claim 10, wherein the $L^*a^*b^*_{in}$ value is converted to the hue value $H_{in}$ by:

$$HO=ARCTAN(b^*/a^*)\cdot 180/\pi; \text{ where}$$

for $a^*>0$ and $b^*\geq 0$, $H_{in}=HO$ for $a^*<0$ and $b^*\geq 0$, $H_{in}=180-HO$ for $a^*>0$ and $b^*\leq 0$, $H_{in}=HO+180$ for $a^*<0$ and $b^*\leq 0$, $H_{in}=360-180$ for $a^*=0$ and $b^*>0$, $H_{in}=90$ for $a^*=0$ and $b^*<0$, $H_{in}=270$ for $a^*=0$ and $b^*=0$, there is only brightness, no color, therefore H=0.

18. The method as claimed in claim 10, where the step of calculating the $L^*a^*b^*_{out}$ value uses:

$$L^*_{out}=L^*_{in}$$

$$a^*_{out}=\cos(H_{OUT}\cdot\pi/180)\times(a_{in}^{*2}+b_{in}^{*2})^{1/2}$$

$$b^*_{out}=\sin(H_{OUT}\cdot\pi/180)\times(a_{in}^{*2}+b_{in}^{*2})^{1/2}.$$

19. The method as claimed in claim 10, wherein the step of converting the $L^*a^*b_{out}$ value to the $XYZ_{out}$ value is done by:

$$YO=(L^*_{out}+16)/116$$

$$XO=a^*_{out}/500+YO$$

$$ZO=YO-b^*_{out}/200$$

$$X_{out}=XO^3+Xn$$

$$Y_{out}=YO^3+Yn$$

$$Z_{out}=ZO^3+Zn.$$

20. The method as claimed in claim 19, wherein when any one of XO, YO and ZO is less than $0.008856^{1/3}$, the corresponding $X_{out}$, $Y_{out}$ and $Z_{out}$ values are calculated using:

$$X_{out}=(XO-16/116)/7.787$$

$$Y_{out}=(YO-16/116)/7.787$$

$$Z_{out}=(ZO-16/116)/7.787.$$

* * * * *